Patented Jan. 22, 1952

2,583,083

UNITED STATES PATENT OFFICE 2,583,083

OXIDATION OF ACIDIC SULFUR COMPOUNDS

Donald C. Bond, Northbrook, and Nelson B. Russell, Winnetka, Ill., assignors to The Pure Oil Company, Chicago, Ill., a corporation of Ohio No Drawing. Application February 13, 1946, Serial No. 647,220

4 Claims. (Cl. 23—184)

This invention relates to a method for oxidizing acidic sulfur compounds contained in fluids such as hydrocarbon oils and gases, and also to a method for regenerating alkaline solutions which have been employed to remove mercaptans and other acidic compounds from hydrocarbon and other fluids.

It is known to extract mercaptans and other acidic sulfur compounds from hydrocarbon fluids, particularly gasoline and similar light oil distillates by treatment of the distillate with aqueous alkali solutions containing or not containing solubility promoters, and by treatment with alcoholic, glycol and other alkali solutions which are not miscible with the distillate. One process for extracting mercaptans from petroleum distillates is the "Mercapsol" process in which an aqueous sodium hydroxide solution, containing alkali metal naphthenates together with alkali metal cresolates as solubility promoters, is used. The "Mercapsol" process and the reagent used therein are disclosed in Patent No. 2,297,621.

Another process in commercial use is the "Solutizer" process which utilizes alkali metal salts of low-boiling fatty acids, particularly isobutyric acid, and salts of such acids as solubility promoters in aqueous alkali solution.

The "Unisol" process uses an aqueous-alcoholic alkali solution for extracting mercaptans from petroleum distillates.

It is common practice to regenerate solutions of the type just mentioned by steam stripping at temperatures of the order of 200–300° F. in order to hydrolyze mercaptides and release mercaptans which pass overhead with the steam. Although this method of regeneration has proved satisfactory, the cost of the steam required for the stripping operation is relatively high.

It is an object of this invention to provide a method for converting malodorous sulfur compounds contained in water-immiscible fluids, such as hydrocarbon oils and gases, into sulfur compounds which do not have an offensive odor.

It is a further object of this invention to provide a process for removing acidic sulfur compounds from hydrocarbon and other fluids.

It is another object of this invention to provide an improved method of regenerating alkali solutions which have been used for removing acidic sulfur compounds from hydrocarbon and other fluids.

It is still a further object of the invention to provide a catalyst capable of accelerating regeneration of used alkali solutions by means of air blowing and of accelerating sweetening of hydrocarbon oils.

Other objects and advantages will be apparent from the following description of the invention.

It has now been found that sweetening of hydrocarbon oils and gases and other fluids containing acidic sulfur compounds can be greatly accelerated by contacting such fluids with a gas containing free oxygen, such as air, in the presence of an alkali solution, immiscible with said fluids, containing an alkyl substituted hydroxy aromatic compound of the type which is capable of forming a quinone upon oxidation. It has been further found that regeneration of alkali solution which has been used to extract mercaptans from hydrocarbon and other fluids, immiscible with the alkali solution, under non-oxidizing conditions can be accelerated by contacting such solutions with air or other gas containing free oxygen in the presence of alkyl substituted hydroxy aromatic compounds of the type which form quinone upon oxidation. As examples of hydroxy benzenes which form quinone upon oxidation may be mentioned catechol, hydroquinone, pyrogallol and gallic acid. As examples of alkyl groups which may be substituted for hydrogen in the benzene ring of such hydroxyl compounds may be mentioned methyl, ethyl, propyl, butyl and tertiary butyl groups. The presence of one or more alkyl groups in the benzene ring containing the hydroxyl group enhances the effect of the hydroxy aromatic compounds in promoting oxidation of the acidic sulfur compounds.

The invention is applicable to the treatment of hydrocarbon fluids with solutions of alkali in water, alcohols and other solvents immiscible with the fluid to be treated. As examples of suitable solvents may be mentioned methyl alcohol, ethyl alcohol, glycol and mixture thereof with each other and/or with water.

In accordance with our invention, any hydrocarbon fluid which it is desired to treat is contacted with the alkali solution, containing an alkali such as sodium or potassium hydroxide in amounts of approximately 5–30% by weight of free alkali metal hydroxide, with or without solubility promoters, in a ratio of approximately 5 to 50 parts by volume of solution per 100 parts by volume of fluid undergoing treatment. Where sweetening of hydrocarbon fluid is desired, the mixed fluid and alkali solution is contacted with air either by bubbling air therethrough or by passing air and hydrocarbon fluid upwardly through a packed tower and passing the alkali solution downwardly through the tower. The alkali solution should contain approximately .05 to 3% by weight of the oxidation promoter and preferably about 1% by weight. Contact time between the air, alkali and hydrocarbon fluid should be of sufficient duration to oxidize the desired quantity of acidic sulfur compounds to a form which is not obnoxious. Care should be exercised not to carry oxidation to a point which results in destruction of the oxidation catalyst.

Where extraction of mercaptans or other acidic sulfur compounds from hydrocarbon fluid under non-oxidizing conditions is practiced, the alkali solution is contacted under non-oxidizing conditions with the fluid to be extracted in a suitable contacting tower such as a packed tower in which the fluid is passed counter-current to the alkali solution and the alkali solution, after separation from the hydrocarbon fluid, is contacted in a separate tower with air or other oxidizing gas in sufficient amount to oxidize the acidic sulfur compounds to a form which can be removed from the alkali solution. For example, where the alkali solution is used to extract mercaptans from hydrocarbon distillate, the alkali solution will contain mercaptides which are oxidized to disulfides and can be separated from the alkali solution by decantation with or without subsequent washing of the solution with naphtha or other solvent for disulfides.

In the regeneration of the alkali solution, regeneration is carried to a point short of complete removal of the acidic sulfur compounds in order to avoid oxidizing the oxidation catalyst to an inactive form and to avoid the possibility of having substantial amounts of catalyst in the quinone form. The amount of mercaptan or other acidic sulfur compound which should be left in the alkali solution will depend upon the particular oxidation catalyst which is used. Where the invention is used for sweetening gasoline or other fluids, it will be desirable to continue the oxidation until substantially all mercaptans or other acidic sulfur compounds are removed from the fluid. Oxidation should not be continued beyond the point where the hydrocarbon fluid is sweetened, since there is danger of oxidizing catalyst to an inactive form. Where regeneration of alkali solution used to extract acidic sulfur compounds under non-oxidizing conditions from hydrocarbon fluids is practiced, the regeneration may be carried to a point where the alkali solution contains not less than about .05% of mercaptan sulfur at the end of the regeneration period. With some oxidation promoters it may be necessary to discontinue regeneration when the mercaptan sulfur has been reduced to approximately 0.7% by weight. Generally, reduction of mercaptan sulfur to 0.2 to 0.6% by weight is satisfactory.

Where the fluid to be treated contains higher boiling mercaptans, such as propyl, butyl and amyl mercaptans, it may be necessary in the regeneration step to add lower boiling mercaptans, such as methyl and ethyl mercaptans, in order to permit reduction of the higher boiling mercaptan content to less than 0.2% by weight and still have sufficient lower boiling mercaptans present to protect the oxidation catalyst. If high-boiling mercaptans are not reduced to a low level, they may re-enter the hydrocarbon fluid upon contacting the regenerated alkali solution with further quantities of fluid.

Either sweetening or air regeneration may be conducted at ordinary atmospheric temperatures. Temperatures between 60° F. and 130° F. are satisfactory. Lower or higher temperatures may be used. However, lower temperatures require longer periods for sweetening and regeneration, whereas, higher temperatures are not desirable because of the possibility of forming undesirable oxidation by-products.

In order to demonstrate the efficacy of butyl pyrogallol, several different compounds were tested in the following manner: 1.86 cubic centimeters of normal butyl mercaptan were dissolved in 50 cubic centimeters of an aqeous sodium hydroxide solution containing 10% by weight of sodium hydroxide in order to give a solution containing 1% by weight of mercaptan sulfur. To the sodium hydroxide solution was added 0.55 gram of the desired catalyst in order to have present 1% by weight of catalyst in the solution. In some cases in order to hasten solution of the catalyst, the solution was agitated with nitrogen which had first been passed through alkaline pyrogallol solution to remove any oxygen. The solution containing the sodium hydroxide, normal butyl mercaptan and catalyst were placed in a 100 cc. graduated cylinder filled to the 75 cc. mark with No. 4 glass beads. Air was bubbled through the solution for one hour at the rate of 0.03 cubic foot per hour by means of a tube reaching to the bottom of the cylinder. After the solution had been blown for one hour with air at room temperature (approximately 75° F.) it was extracted with approximately 100 cubic centimeters of V. M. P. naphtha to remove the disulfides that had formed. The resulting naphtha containing the disulfides was treated with acidic silver nitrate to remove any unoxidized mercaptans and the solution was then analyzed for disulfides. Among the compounds tested were butyl pyrogallol, pyrogallol and phloroglucinol. The results of these tests are tabulated in the following table:

*Table I*

| Catalyst Used in Test | g. Disulfide Sulfur found in Naphtha Solution | Per cent by Wt. of n-butyl Mercaptan Oxidized |
|---|---|---|
| Butyl Pyrogallol | 0.493 | 89 |
| Pyrogallol | 0.384 | 69.3 |
| Phloroglucinol | 0.003 | 0.5 |

As appears from the table, butyl pyrogallol was outstanding as an oxidation accelerator. After blowing for one hour with air at the rate of 0.03 cubic foot per hour, 89% of the mercaptan was oxidized to disulfide, whereas with pyrogallol oxidation of only 69.3% of the mercaptan was effected under the same conditions. In contrast to these results, without any catalyst present only 0.9% of the normal butyl mercaptan was oxidized to disulfide.

On the other hand, phloroglucinol, another trihydroxy benzene, inhibited rather than catalyzed the regeneration of the used alkali. Only 0.5% of the normal-butyl mercaptan was oxidized to disulfide.

In order to further demonstrate the effect of alkyl groups when substituted in an aromatic nucleus containing hydroxy groups, a series of tests, similar to those made and reported in Table I, were made on alcoholic potassium hydroxide solution containing no hydroxy aromatic compound and on the same solution containing 1% of the following compounds: hydroquinone, toluhydroquinone and 2,5 di-tertiary butyl hydroquinone. The tests were carried out in precisely the same manner and with the same amount of solution and air as used in the tests, results for which are tabulated in Table I. The results on these tests are reported in Table II.

Table II

| Solution | Per cent of the Butyl Mercaptan Oxidized |
|---|---|
| 10% KOH in Formula 30 Alcohol | 11.6 |
| Same as above +1% Hydroquinone | 33.2 |
| Same as above +1% Toluhydroquinone | 38.3 |
| Same as above +1% 2,5 Di-tertiary Butyl Hydroquinone | 81.3 |

It is apparent from Table II that the substitution of a methyl group in hydroquinone (toluhydroquinone or 2-methyl hydroquinone) increases the activity of the hydroquinone from 33.2% to 38.3% of the butyl mercaptan oxidized. The substitution of two tertiary butyl groups for hydrogen in the nucleus of hydroquinone (2,5 di-teriary hydroquinone) increases the effectiveness of hydroquinone from 33.2% to 81.3%. Branched chain alkyl groups are more effective than the straight chain alkyl groups in enhancing the catalytic activity of the polyhydroxy aromatic compounds.

In order for oxidation promoters in accordance with our invention to be effective, they should be soluble in the alkali solution. If the promoter is not soluble in aqueous solution, a solubilizing agent such as cresol may be added to make the promoter go into solution. Toluhydroquinone and 2,5 di-tertiary butyl hydroquinone are soluble in alcoholic alkali solution, but are not soluble in aqueous alkali solution without a solubilizing agent.

It should be understood that the specific compounds tested are only by way of examples to demonstrate the invention. The invention is directed broadly to the use of alkyl substituted, hydroxy aromatic compounds which are capable of forming quinones upon oxidation and therefore act as oxidation catalysts in the sweetening of hydrocarbon fluids with air or other oxidizing gas in the presence of alkali and in the regeneration of alkali solution used to extract acidic sulfur compounds from hydrocarbon fluids and other fluids immiscible with the alkali solution, and more particularly to single ring di- and tri-hydroxy aromatic compounds in which at least two hydroxy groups are ortho or para to each other and in which one or more alkyl groups are substituted for hydrogen in the benzene ring. Further examples of such compounds are: 5-methyl, 5-ethyl, 4-propyl, 4-butyl, 4-amyl, 4-hexyl, 4-heptyl, 5-amyl, tertiary butyl, and diamyl pyrogallol. Such compounds may be used in their pure state or substances containing substantial quantities of such compounds may be used.

Alkali solutions containing oxidation promoters or catalysts in accordance with our invention may be repeatedly used for sweetening or repeatedly regenerated if care is exercised not to carry oxidation to a point where the catalyst is destroyed. It may be necessary from time to time to add small amounts of the oxidation catalyst to maintain the efficiency of the solution for promoting the oxidation reaction.

It is to be understood that the rate of air blowing used in the specific examples herein disclosed is not to be considered as the most desirable rate for commercial operation. Obviously, where large scale equipment is used the rate of air blowing will considerably exceed that used in the tests. The rate of air blowing may vary within wide limits and will be adjusted in accordance with the size and type of equipment used in the regeneration step to obtain most rapid regeneration with minimum loss of solution by carry-over in the exhaust air.

This application is a continuation-in-part of application Serial No. 522,617, filed February 16, 1944, now abandoned.

It is claimed:

1. The process of converting mercaptans occurring in hydrocarbon oils to disulfides comprising intimately contacting said mercaptans with a gas containing free oxygen in the presence of a caustic alkali solution containing a small amount but sufficient to promote oxidation of 2,5-di-tertiary butyl hydroquinone as an oxidation promoter and controlling oxidation to prevent destruction of the promoter.

2. Process in accordance with claim 1 in which the alkali solution is an alcoholic solution of alkali.

3. The process of regenerating a caustic alkali extraction solution substantially spent in extraction of mercaptans from hydrocarbon fluids comprising, contacting said solution in the presence of a small amount but sufficient to promote oxidation of 2,5-di-tertiary butyl hydroquinone as an oxidation promoter with a gas containing free oxygen in such manner as to oxidize sufficient mercaptides to make the solution useful for extracting mercaptans from hydrocarbon fluids but to leave sufficient of said mercaptides in said solution to maintain the catalytic activity of said promoter, and removing the resulting disulfides from the solution.

4. Process in accordance with claim 3 in which the alkali solution is an alcoholic solution of alkali.

DONALD C. BOND.
NELSON B. RUSSELL.

REFERENCES CITED

The following references are of record in the file of this patent:

UNITED STATES PATENTS

| Number | Name | Date |
|---|---|---|
| 1,943,774 | Rosenstein | Jan. 16, 1934 |
| 2,015,038 | Pevere | Sept. 17, 1935 |
| 2,315,530 | Loyd | Apr. 6, 1943 |
| 2,316,092 | Loyd | Apr. 6, 1943 |
| 2,369,771 | Bond | Feb. 20, 1945 |

FOREIGN PATENTS

| Number | Country | Date |
|---|---|---|
| 126,544 | Hungary | Mar. 17, 1941 |